United States Patent
Hoffmann

[11] 3,754,172
[45] Aug. 21, 1973

[54] MEASURING CAPACITOR

[75] Inventor: Dieter Hoffmann, Uster, Switzerland

[73] Assignee: Zellweger Ltd., Uster, Switzerland

[22] Filed: Aug. 2, 1971

[21] Appl. No.: 168,150

[30] Foreign Application Priority Data
Aug. 4, 1970 Switzerland................................ 11710

[52] U.S. Cl.................... 317/246, 317/242, 317/261
[51] Int. Cl................................................ H01g 1/06
[58] Field of Search................ 317/261, 246, 249 D, 317/258

[56] References Cited
UNITED STATES PATENTS

| | | | |
|---|---|---|---|
| 2,998,559 | 8/1961 | Smith.................................. | 317/246 |
| 3,009,101 | 11/1961 | Locher............................... | 317/246 X |
| 3,170,099 | 2/1965 | Sperry................................ | 317/249 D |
| 3,303,550 | 2/1967 | Banzhof............................. | 317/258 X |
| 3,426,257 | 2/1969 | Youngquist........................ | 317/261 X |
| 3,493,825 | 2/1970 | Khouri................................ | 317/261 X |
| 3,515,987 | 6/1970 | Zurbrick............................. | 317/246 X |

FOREIGN PATENTS OR APPLICATIONS
500,167   2/1939   Great Britain...................... 317/261

*Primary Examiner*—E. A. Goldberg
*Attorney*—Craig, Antonelli & Hill

[57] ABSTRACT

A device for measuring the physical characteristics of textile materials, such as slivers, rovings and yarns, is provided in the form of a capacitor having electrodes comprising a pair of substantially parallel bodies of high frequency ceramic material having plane parallel surfaces and being separated by an air space to permit passage of the textile material therethrough. Each ceramic body is provided with one conductive coating forming the capacitor electrode and a surrounding coating serving as a shield. A terminal extends through said ceramic body from one end thereof into contact with the capacitor electrode.

6 Claims, 3 Drawing Figures

Patented Aug. 21, 1973

3,754,172

MEASURING CAPACITOR

This invention relates to a measuring electrode for capacitive measuring.

The capacitive measuring method has proved to be eminently suitable for the continuous measurement of textile material, especially slivers, rovings and yarns, with regard to their cross-sectional form. In principle, this method employs a plate capacitor with a dielectric which consists of air as long as there is no textile material between the plates. In this case, the capacity of this capacitor has a certain basic value. If textile material is then introduced into the space between the plates, the capacity changes on account of the relative dielectric constant of the textile material which differs from one. These changes in capacity can be converted per se into electrical signals by methods known for example by connecting the plate capacitor into a high frequency resonant circuit, in which case the variations in capacity after the resonant frequency of the resonant circuit.

Providing the quantity of textile material introduced into the plate capacitor is not too large, it is possible to establish a substantially linear relationship between the cross section of the textile material situated between the plates and the variations in capacity. At the same time, it is also possible in this way to reduce the influence of the moisture content of the textile material, as part of the dielectric with a dielectric constant different from one, to a level which no longer adversely affects the result of the measurement.

Since the measuring electrodes are actually parts of the plates forming the capacitor and since the variations in capacity caused by the textile material are extremely small, efforts have to be made to ensure that both the mechanical and the electrical stability of the measuring electrodes are extremely high in order to prevent apparent changes in the measurements obtained through variations in capacity that are not attributable to the quantity of textile material present in the capacitor.

Measuring capacitors of known type assembled into plate capacitors consist of metallic electrodes in the form of prismatic rods which are secured at the requisite intervals to a high-quality insulating plate. In order to avoid additional variations in capacity caused by outside influences upon the stray fields of the capacitors, the electrodes with a high-frequency voltage applied to them have been provided with suitable grounded screens. The arrangement as a whole required extremely careful assembly and the requisite stability of the basic capacity could only be approximated.

An object of the present invention is to provide significant improvements in this respect. Accordingly, the invention provides a measuring electrode wherein metallic electrodes are formed by coatings applied by vapor deposition to a body of high frequency ceramic material reproducing the form of the electrodes, the metal layers being thickened.

At least two such measuring electrodes can be assembled together to form a plate capacitor.

An electrode pattern is advantageously applied to either side of the ceramic body, comprising the actual measuring electrode and a protective electrode which seals the measuring electrode off from the outside.

Due to the considerable differences in the fiber content of the textile material to be tested, several electrodes can be arranged adjacent one another at decreasing intervals so as to form plate capacitors with constantly decreasing electrode intervals. The textile materials to be inserted into the capacitors with the limited intervals also enable the depth of the electrodes to be shortened so that not too much unnecessary dead capacity is incorporated in the measuring element.

The outstanding stability of the measuring capacitors assembled from the measuring electrodes according to the invention enables a considerably greater measuring range to be allocated to each individual part of the capacitor than was possible in the case of conventional measuring capacitors. The result of this is that it is possible to assemble one measuring capacitor for the entire measuring range with fewer capacitor electrodes. As a result, it is smaller, easier to handle and above all less expensive.

Figure 1:
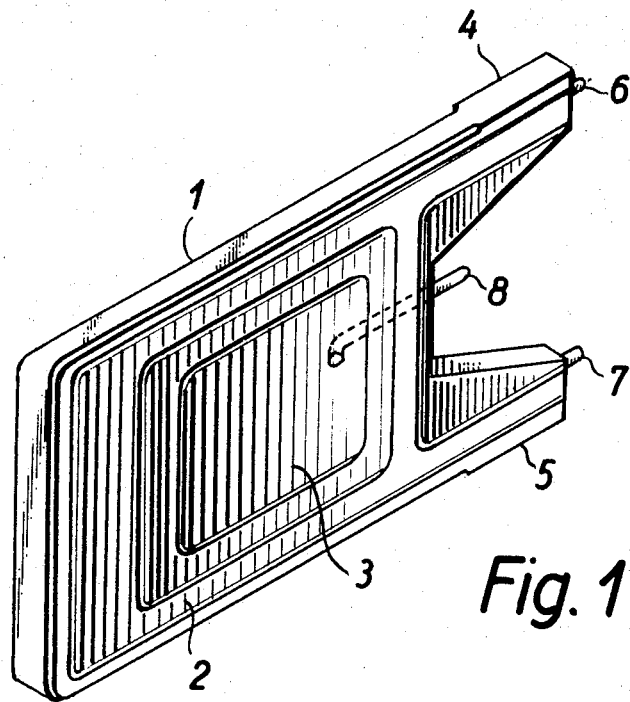
FIG. 1 is a perspective view of a measuring electrode.

The measuring electrode illustrated comprises a prismic insulating body 1 of a high-frequency ceramic material with coatings 2 and 3 applied to both sides by vapor deposition and galvanically thickened; the coating 2 forms a protective or shield electrode and the coating 3 forms the actual capacitor electrode. The electrode is fixed between plane-parallel spacer members by means of fasteners 4 and 5. Terminals 6 and 7 are connected to the protective electrode 2 and a terminal 8 is connected to the coating 3 inside the insulating body.

The high-frequency ceramic material used as the constituent material for the electrode bodies enables them to be ground to absolutely parallel lateral surfaces. Since the spacer members 11 which determine the plate interval of the capacitor electrodes can also be made plane-parallel with extreme precision, it is ensured that the structure of the capacitor as a whole is extremely stable and gives reproducible measurements.

Another advantage of using a high-frequency ceramic material as the electrode material with metal coatings applied by vapor deposition is that the dimensions of the electrodes are determined solely by the temperautre behavior of the ceramic material. The vapor-deposited metal coatings participate completely in the dimensional changes which the insulating body undergoes due to variations in temperature. Accordingly, the electrodes are not subjected to any flexural stresses which could result in inadmissible changes in the electrode intervals.

The inevitable variations in the zero capacity of the measuring capacitor consisting of several electrodes attributable to the variations in temperature can be almost completely compensated by suitable bridge circuits because the variations which, basically, are small are determined solely by the temperature behavior of the high-frequency ceramic material and as a result can be allowed for from the outset.

Figure 2:
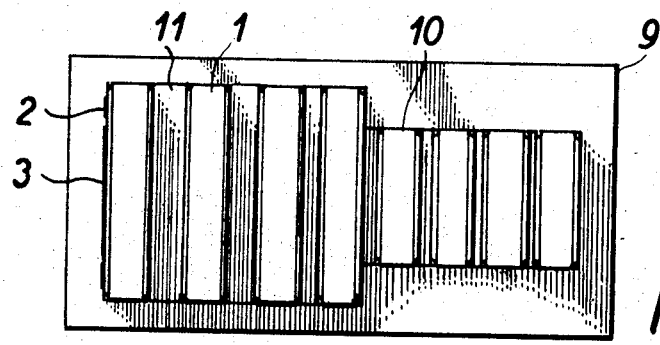
FIG. 2 is a plan view.

FIG. 2 is a plan view of a measuring capacitor assembled from several measuring electrodes. Measuring electrodes 1, 1', 1'', 1''' and 10, 10', 10'', 10''' are secured to a base plate 9 and are held apart at strictly predetermined intervals by the plane-parallel spacer members 11. The electrodes 1, 1' and 10'', 10''' are shown in section.

Figure 3:
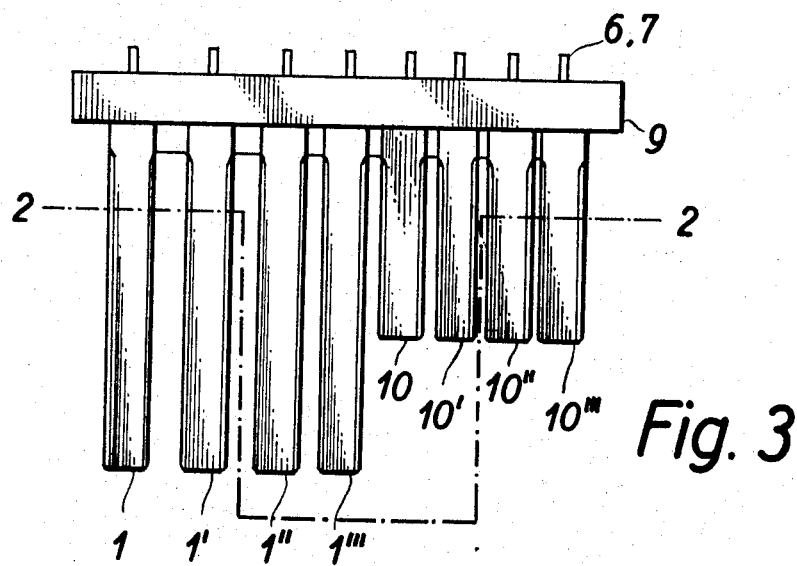
FIG. 3 is a side elevation of a measuring capacitor assembled from several measuring electrodes.

FIG. 3 is a side elevation of the measuring capacitor. It can be seen that the measuring electrodes 10, 10', 10'', 10''' are considerably shorter than the measuring electrodes 1, 1', 1'', 1'''.

Textile material, such as slivers, rovings or yarns, can be guided between the measuring elecrodes of such a measuring capacitor which forms a unit for measuring cross section of the textile material.

I claim:

1. A measuring electrode for use in a plate capacitor capable of measuring the physical characteristics of textile materials, such as slivers, rovings and yarns, comprising
    a body of high frequency ceramic material having plane-parallel surfaces,
    at least one conductive coating applied with uniform thickness by vapor deposition to at least one plane surface of said ceramic body, including aterminal extending through said ceramic body from one end thereof into contact with said capacitor electrode, and
    an additional conductive coating provided on the plane surface of said ceramic body in surrounding relationship to said one coating to serve as a shield, including second and third terminals connected to said additional conductive coating by coatings continued on the surface of said body to one end thereof.

2. A device for measuring the physical characteristics of textile materials, such as slivers, rovings and yarns, comprising
    a pair of substantially parallel bodies of high-frequency ceramic material having plane-parallel surfaces and being separated by an unobstructed air space to permit passage of the textile material therethrough, and
    at leat one conductive coating forming a capacitor electrode applied with uniform thickness by vapor deposition to at least one plane surface of each of said ceramic bodies.

3. A device as defined in claim 2 wherein an additional conductive coating is provided on the plane surface of each ceramic body in surrounding relationship to said one coating, said one coating serving as the capacitor electrode and said additional coating serving as a shield.

4. A device as defined in claim 3 wherein said plane surfaces of said ceramic bodies are ground so as to be absolutely plane-parallel and said bodies being disposed is closely spaced-parallel relationship.

5. A measuring electrode as defined in claim 2 including a terminal extending through said ceramic body from one end thereof into contact with said capacitor electrode.

6. A measuring electrode as defined in claim 5 including second and third terminals connected to said additional conductive coating by coatings continued on the surface of said body to one end thereof.

* * * * *